(12) United States Patent
Denat et al.

(10) Patent No.: US 9,534,700 B2
(45) Date of Patent: Jan. 3, 2017

(54) VALVE ACTUATOR

(75) Inventors: Frederic Denat, St Just St Rambert (FR); Mourad Rezig, Valence (FR)

(73) Assignee: Zodiac Aerotechnics, Plaisir (FR)

( * ) Notice: Subject to any disclaimer, the term of this patent is extended or adjusted under 35 U.S.C. 154(b) by 270 days.

(21) Appl. No.: 13/700,138

(22) PCT Filed: Jun. 1, 2010

(86) PCT No.: PCT/EP2010/057656
§ 371 (c)(1),
(2), (4) Date: Feb. 12, 2013

(87) PCT Pub. No.: WO2011/150966
PCT Pub. Date: Dec. 8, 2011

(65) Prior Publication Data
US 2013/0134334 A1   May 30, 2013
US 2013/0341542 A2   Dec. 26, 2013

(51) Int. Cl.
*F16K 37/00* (2006.01)
*F16K 31/00* (2006.01)
*F16K 31/04* (2006.01)

(52) U.S. Cl.
CPC .............. *F16K 31/00* (2013.01); *F16K 31/043* (2013.01); *F16K 31/046* (2013.01); *F16K 37/0083* (2013.01); *F16K 37/0091* (2013.01)

(58) Field of Classification Search
CPC .... F16K 31/042; F16K 31/043; F16K 31/046; F16K 31/055; F16K 37/0075; F16K 37/0083; F16K 37/0091
(Continued)

(56) References Cited

U.S. PATENT DOCUMENTS 5,333,833 A * 8/1994 Reinicke ..................... 251/77
5,950,668 A * 9/1999 Baumann ................. 137/487.5
(Continued)

FOREIGN PATENT DOCUMENTS

WO          9960291 A1   11/1999
WO    WO 2008007058 A2 *  1/2008

OTHER PUBLICATIONS

International Search Report dated Mar. 31, 2011 in Application No. PCT/EP2010/057656.

*Primary Examiner* — William McCalister
*Assistant Examiner* — Ian Paquette
(74) *Attorney, Agent, or Firm* — Kilpatrick Townsend & Stockton LLP; Dean W. Russell; Kristin M. Crall

(57) ABSTRACT

The valve actuator (1) includes a housing (2), a motor (4) coupled to the valve, wherein rotation of the motor (4) changes the position of the valve from a first position in which fluid flow may occur along at least one path and a second position in which fluid flow is either blocked or may occur along at least one second path, said motor (4) being normally supplied with electrical power from a main source of electrical power, at least one sensor (24,132) configured to detect the position of the valve and/or the valve speed, a switch (16) controlling the delivery of electrical power to the motor (4), and a power circuitry (19) connected to the switch (16). The valve actuator further includes a controller (20) connected to the at least one sensor (24,132) and to the power circuitry (19), said controller (20) collecting in real time data relative to the position and/or the speed of the valve and data relative to the power setting, calculating the position and/or speed correction in pro rata to errors between the collected data relative to the position and/or the speed of the valve and collected data relative to the power setting, and sending a new power setting to the power circuitry (19), wherein the power circuitry (19) amplifies the controller signal.

16 Claims, 4 Drawing Sheets

(58) Field of Classification Search
USPC ............ 251/129.03, 129.04, 129.05, 129.11,
251/129.12, 129.13, 249.5; 137/554;
324/207.2, 207.21, 207.24, 207.25, 251,
324/252
See application file for complete search history.

(56) References Cited

U.S. PATENT DOCUMENTS

| | | | |
|---|---|---|---|
| 6,220,566 B1* | 4/2001 | Miller | 251/58 |
| 6,460,567 B1 | 10/2002 | Hansen, III et al. | |
| 8,118,276 B2* | 2/2012 | Sanders et al. | 251/129.04 |
| 8,783,277 B2* | 7/2014 | Mori et al. | 137/1 |
| 2004/0193327 A1* | 9/2004 | Yakushi | 700/282 |
| 2007/0034264 A1 | 2/2007 | Kunz et al. | |
| 2008/0060706 A1 | 3/2008 | Combs | |
| 2008/0173762 A1 | 7/2008 | Crowley | |
| 2008/0264385 A1* | 10/2008 | Hetzer et al. | 123/446 |

\* cited by examiner

VALVE ACTUATOR

CROSS REFERENCE TO RELATED APPLICATION

This application is the U.S. national phase of International Application No. PCT/EP2010/057656 filed on Jun. 1, 2010, and published in English on Dec. 8, 2011 as International Publication No. WO2011/150966 A1, the contents of which are incorporated herein by reference.

FIELD OF THE INVENTION

The present invention relates generally to valve actuator. It relates more particularly to a valve actuator for actuating a valve, such a fuel valve for example, particularly but not necessarily exclusively, attempted to be connected to an electronic control unit and/or another valve actuator.

BACKGROUND OF THE INVENTION

Valve actuators find wide application and are notably used in conventional refuelling systems onboard aircrafts.

The valve actuators generally all have processor control for setting, monitoring and controlling the actuator. Key control factors include actuator position, i.e. valve position, and actuator torque (primarily for rotary output actuators) and thrust (primarily for linear output actuators). In a rotary output actuator, for example, valve position is typically determined by counting the revolutions or part of a revolution of the driven rotary output shaft by a rotary encoder. The load generated at the actuator output shaft in such an actuator is typically determined by mechanical means, such as by a strain gauge or by a pressure transducer. Load might also be determined from a torque related current in the motor.

Moreover, the valve actuators generally also have facility for failsafe if, for example, there is an electrical power failure. To this end, the majority of actuators further incorporate a compression spring return mechanism to restore the actuator to the desired failsafe position.

Nevertheless, this type of valve actuator presents the drawback of providing a water hammer in case of overpressure.

Moreover, in refuelling system of aircrafts, these valve actuators allow only a general regulation as disclosed in the document US2008/0173762. This document discloses an aircraft refuelling system allowing the refuelling rates to be increased, in which fuel flow restrictors are mounted in the refuelling pipework of the aircraft and restrict the flow rate of fuel from the refuelling pipework into the fuel tanks. Fuel valves are also provided to allow each tank to be disconnected from the refuelling pipework. A general regulation is performed by a fuel pressure regulator on board the aircraft so as to define the maximum pressure in the refuelling pipework. This kind of general regulation is not adapted when there is a need to more refuelling a specific fuel tank. The onboard fuel circuit of an aircraft thus cannot be always optimized according to the concrete needs.

Therefore, a need exists for a valve actuators avoiding water hammer when an overpressure appears and allowing a new way of refuelling the respective fuel tanks of an aircraft notably.

SUMMARY OF THE INVENTION

Embodiments of the present invention provide a valve actuator including:
a housing
a motor coupled to the valve, wherein rotation of the motor changes the position of the valve from a first position in which fluid flow may occur along at least one path and a second position in which fluid flow is either blocked or may occur along at least one second path, said motor being normally supplied with electrical power from a main source of electrical power,
at least one sensor configured to detect the position of the valve and/or the valve speed,
a switch controlling the delivery of electrical power to the motor,
a power circuitry connected to the switch; and characterized in that it further includes a controller connected to the at least one sensor and to the power circuitry, said controller collecting in real time data relative to the position and/or the speed of the valve and data relative to the power setting, calculating the position and/or speed correction in pro rata to errors between the collected data relative to the position and/or the speed of the valve and collected data relative to the power setting, and sending a new power setting to the power circuitry, wherein the power circuitry amplifies the controller signal.

The valve is a ball valve comprising a reduction gear assembly coupling the motor to the valve. Said motor is a brushless motor.

Accordingly, the power settings sends by the controller to the power circuitry is function of at least one parameter.

According to a specific feature, the power setting sends by the controller to the power circuitry is function of time.

Moreover, the power setting sends by the controller to the power circuitry is preferably stored in a non volatile memory.

Accordingly, the power setting is a function of time according to the following equation:

$$\text{powersetting} = at^3 - bt^2 + ct$$

wherein a, b and c are constants and t is the time expressed in seconds.

Furthermore, the valve actuator further comprises means to detect a motor failure.

According to a specific feature, the controller further comprises means to connect said controller to an electronic control unit (ECU) adapted to be connected with a plurality of valve actuator.

According to another feature, the controller further comprises means to connect said controller to at least one another valve actuator.

Furthermore, the motor comprises a hall sensor to detect the position and/or the rotation of said motor.

Said reduction gear assembly coupling the motor to the valve includes a worm gear.

Optionally, the reduction assembly further includes a knob shaped to be turned manually either by grasping or by use of a tool and the reduction assembly further includes a clutch assembly connecting the knob to the valve stem and to the gear assembly.

According to another feature, the controller includes means for calculating the position and/or speed correction in pro rata to errors between the collected data relative to the position and/or the speed of the valve and collected data relative to the power setting.

Preferably, the valve actuator further comprises means adapted to detect a failure in the valve actuator, such that a failure of the controller, a position error of the valve, or an overcurrent for example.

Furthermore, the opening and/or the closing of the valve is actuated with a constant speed when a failure is detected in the valve actuator.

Other features and advantages of the invention will become apparent to those skilled in the art during the description which will follow, given by way of a non-limiting example, with reference to the appended drawings.

DETAILED DESCRIPTION OF EMBODIMENTS

In the various figures, the same references are used to designate identical or similar elements.

Figure 1:
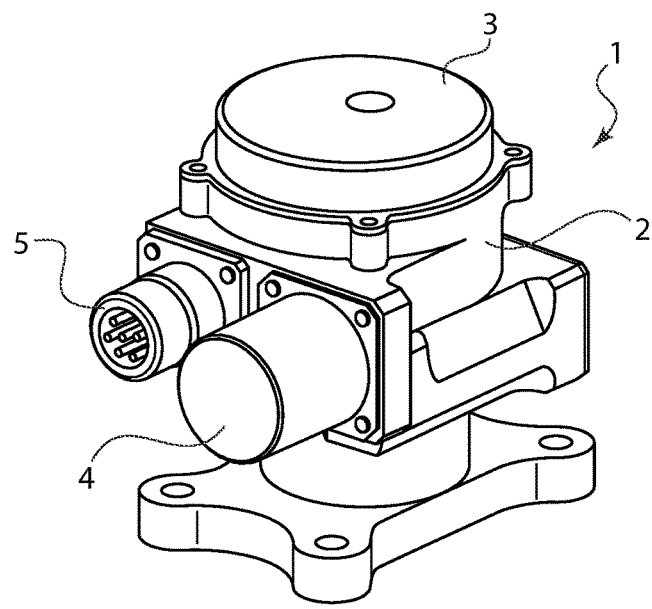
FIG. 1 is a perspective view of a valve actuator according to the present invention.

FIG. 1 is a perspective view of a valve actuator 1 according to the present invention. A shown in FIG. 1, the valve actuator 1 includes a cylindrical housing 2 closed by a cap 3 and holding an electric motor 4, such as a brushless motor, and a plug 5. The motor 4 is coupled to the valve, not shown, in such a manner that rotation of the motor changes the position of the valve from a first position in which fluid flow may occur along at least one path and a second position in which fluid flow is either blocked or may occur along at least one second path, said motor being normally supplied with electrical power from a main source of electrical power, not shown.

The valve is preferably a ball valve. Said ball valve is a valve with a spherical disc, the part of the valve which controls the flow through it. The sphere has a hole, or port, through the middle so that when the port is in line with both ends of the valve, flow will occur. When the valve is closed, the hole is perpendicular to the ends of the valve, and flow is blocked. It could be a a full port or more commonly known full bore ball valve has an over sized ball so that the hole in the ball is the same size as the pipeline resulting in lower friction loss, a reduced port or more commonly known reduced bore ball valves wherein flow through the valve is one pipe size smaller than the valve's pipe size resulting in flow area becoming lesser than pipe, a V port ball valve has either a 'v' shaped ball or a 'v' shaped seat, or a trunnion ball valve which has a mechanical means of anchoring the ball at the top and the bottom. Moreover, it could be a multi-port ball valves such as a three-way ball valves having an L- or T-shaped hole through the middle, a 4 ways ball valve, or more.

Even though ball valve is well known for its durability, it should be noted that the ball valve can be substituted by any type of known valve such as a Gate valve, a Globe valve, a Knife valve, a Needle valve, a Piston valve, a Pinch valve, a Plug valve, a Spool valve, etc. . . . without departing from the scope of the invention.

Figure 2:
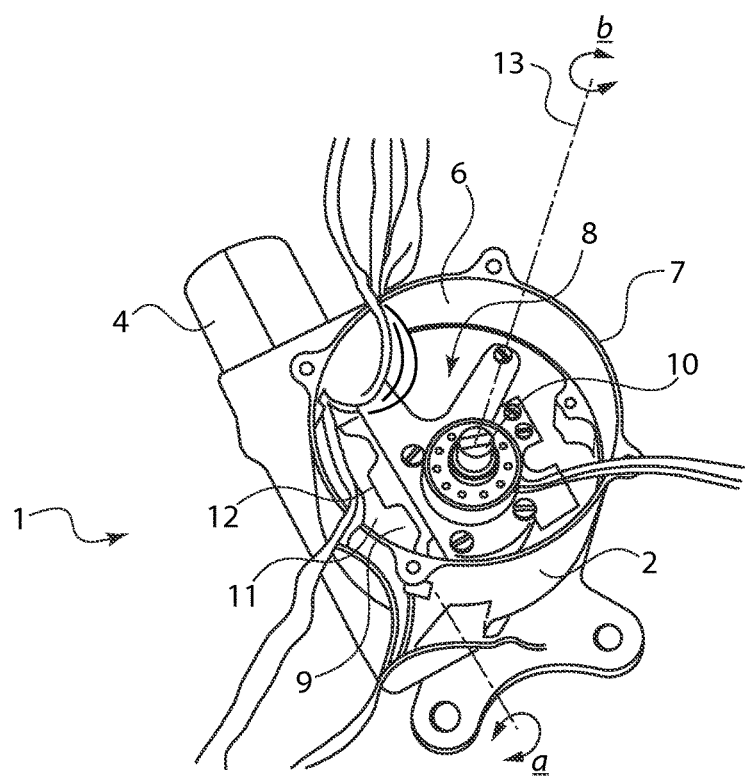
FIG. 2 is a perspective view of the inside of the valve actuator according to the invention.

Referring to FIG. 2, the housing 2 defines an enclosure 6 and a rim 7 receiving the cap 3. A gearbox 8 is disposed within the enclosure 6, said gearbox 8 including a worm wheel 9 which is connected to a shaft 10 for actuating the valve. The gearbox 8 further includes a worm 11 coupled to the motor 4 and defining a gear 12 which cooperates with the worm wheel 9.

Optionally, it further comprises a reduction gear assembly coupling the motor to the worm, a knob shaped to be turned manually either by grasping or by use of a tool, and a clutch assembly connecting the knob to the valve stem and to the gear assembly, not shown.

The arrangement is such that when the worm 11 is rotated by the motor 4 as indicated by the arrow a about the longitudinal axis of the worm 11, said worm 11 rotates the worm wheel 9 about a further axis of rotation as indicated by the arrow b. The further axis of rotation 13 is disposed substantially normal to the axis of the worm 9 and corresponds to the longitudinal axis of the shaft 10 actuating the valve.

Figure 3:
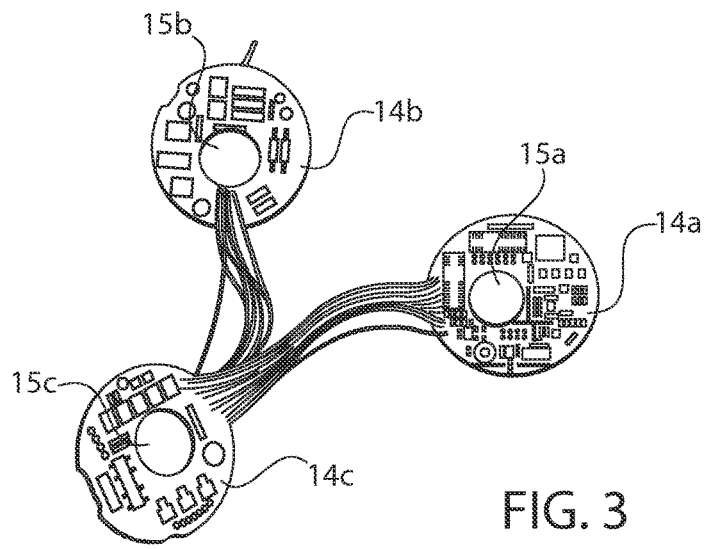
FIG. 3 shows the different parts of the circuitry of the valve actuator according to the invention.

Moreover, referring to FIGS. 2 and 3, the valve actuator 1 comprises at least one sensor configured to detect the position of the valve and/or the valve speed, not shown, a switch controlling the delivery of electrical power to the motor, a controller and a power circuitry connected to the switch. Said sensor can consist in any sensor well known by the man skill in the art such an optical sensor, a magnetic sensor, hall sensor, etc. . . . The switch controlling the delivery of electrical power to the motor, the controller and the power circuitry are positioned in three disc-shape substrates 14a,14b,14c interconnected, each disc-shape substrates including a central hole 15a,15b,15c forming a pathway for the shaft 10, and stacked into the enclosure 6.

Figure 4A:
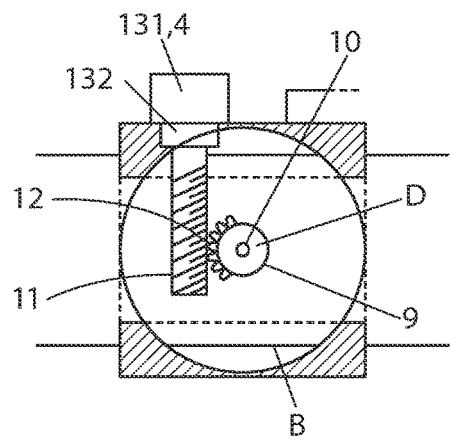
FIGS. 4A and 4B shows respective schematic views of a ball valve piloted by the valve actuator according to the invention, in a closed position and respectively in an opened position.
Figure 4B:
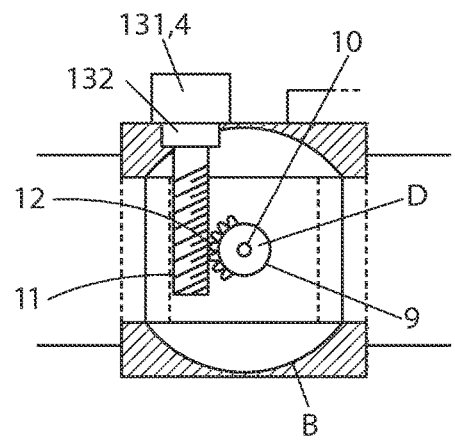

Referring to FIGS. 4A and 4B, the valve body B may be a ball rotated by a conventional positioner (not shown) driven by a motor 4 or servomotor 131 or similar servo-unit. A position sensor 132 provides a signal indicative of the position of the valve body B. When the motor element of the servomotor 131 is of the rotating type, the position sensor 132 may sense the angular position of the valve body B or another element connected to the valve body B. The opening of the valve may be selectively adjusted at a defined open position between the full open position as shown in FIG. 4A and the closed position as shown in FIG. 4B. The actuator allows adjusting in real time the opening of the corresponding valve. The angular position of the rotating drive D may precisely define the opening ratio of the valve body B.

Figure 5:
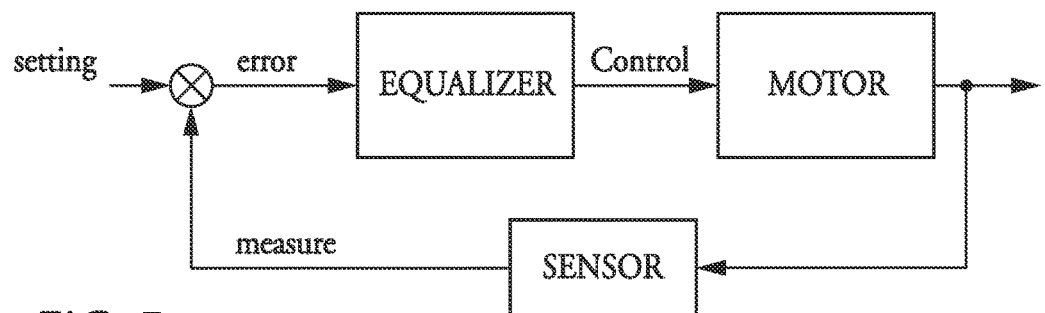
FIG. 5 is a schematic of the process followed by the valve actuator according to the invention.

Advantageously, referring to FIG. 5 which schematically illustrate the process followed by the valve actuator according to the invention, the controller connected to the at least one sensor and to the power circuitry, collects in real time data relative to the position and/or the speed of the valve and data relative to the power setting, calculates the position and/or speed correction in pro rata to errors between the collected data relative to the position and/or the speed of the valve and collected data relative to the power setting, and sends a new power setting to the power circuitry, wherein the power circuitry amplifies the controller signal.

Figure 6:
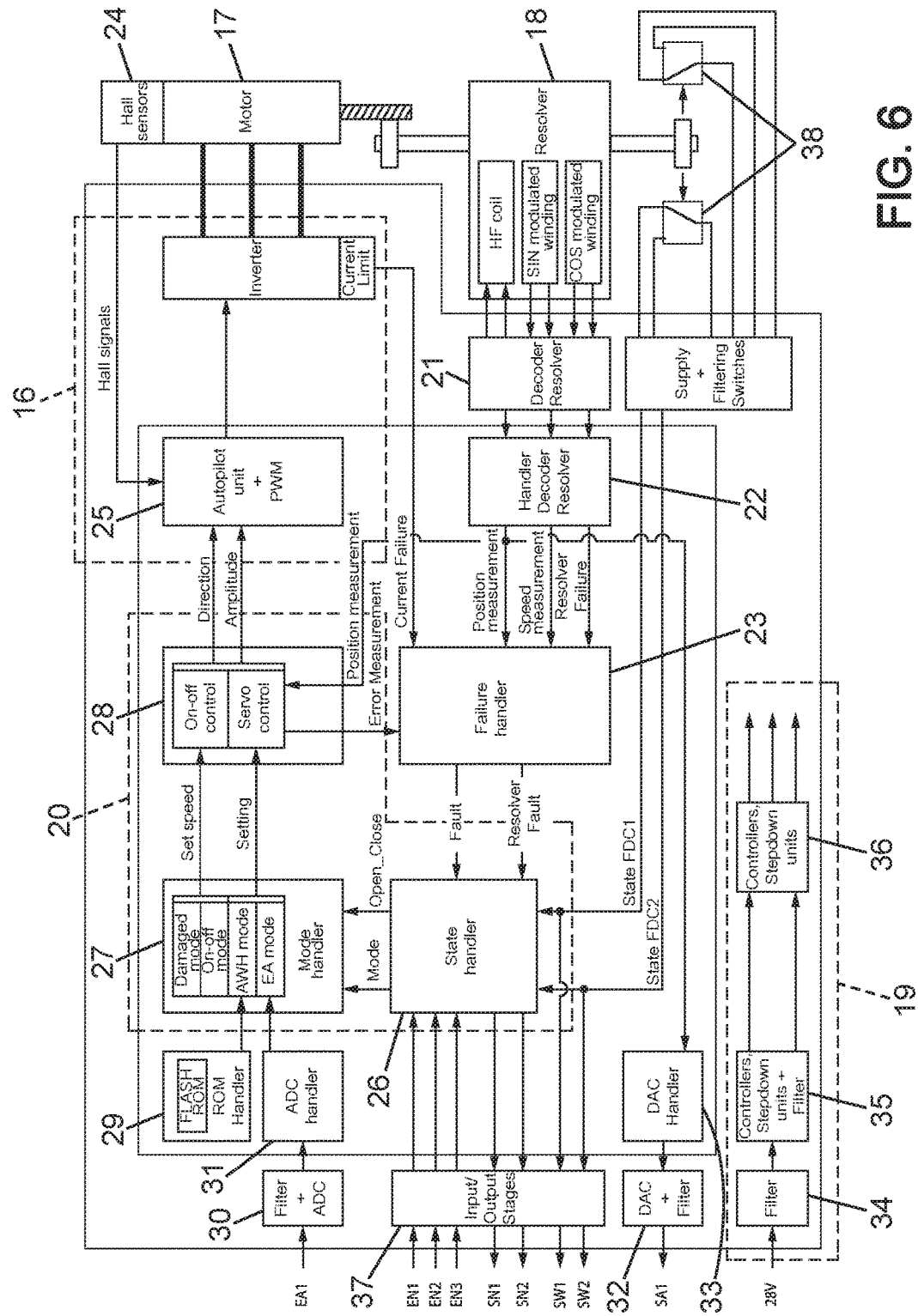
FIG. 6 is a schematic of the electronics of the valve actuator.

Referring to FIG. 6, the electronic circuitry includes a switch 16 controlling the delivery of electrical power to the motor 17, a resolver 18 configured to detect the position of the valve and/or the valve speed, a power circuitry 19 connected to the switch 16 and a controller 20 connected to the resolver 18 and to the power circuitry 19, said controller 20 collecting in real time data relative to the position and/or the speed of the valve and data relative to the power setting, calculating the position and/or speed correction in pro rata to errors between the collected data relative to the position and/or the speed of the valve and collected data relative to the power setting, and sending a new power setting to the power circuitry, wherein the power circuitry 19 amplifies the controller signal.

It should be noted that the resolver 18 can be substituted by any sensors well known by the man skilled in the art and configured to detect the position of the valve and/or the valve speed without departing from the scope of the invention.

In the embodiment shown in FIG. 6, the circuitry further includes a decoder 21 connected, in a first hand, to the resolver 18 and, in a second hand, to a decoder's handler 22. Said decoder's handler is connected to the controller 20 and to a failure's handler 23.

Optionally, the motor 17 comprises a hall sensor 24 to detect the position and/or the rotation of said motor. Said hall sensor 24 is connected to a power controller and autopilot unit 25 of the switch 16.

Moreover, the controller 20 includes a state's handler 26 connected to a mode's handler 27 which is connected to a control unit 28. The control unit 28 is connected to the power controller and autopilot unit 25 of the switch 16. The circuitry includes also a non volatile memory ROM 29 connected to the mode's handler 27, a first Analog to Digital Converter called ADC 30 connected to a first ADC's handler 31 which is connected to the mode's handler 27 of the controller 20, a second Analog to Digital Converter (ADC) 32 connected to a second ADC's handler 33 which is connected to the decoder's handler 22 of the resolver 18. Each Analog to Digital Converter 30 and 32 includes at least one filter.

The power circuitry 19 includes a filter 34 protecting the circuitry against overcurrents, ligthnings and electromagnetic interference (EMI), a first unit 35 with step down, control and filter functions and a second unit 36 with step down and control functions.

The circuitry includes an input/output stage 37 comprising a plurality of input logic gates and output logic gates.

The mode's handler 27 comprises at least three modes, a first mode called "damaged mode" wherein the valve is actuated with a constant high speed independently of a failure of the position sensor, a second mode called "on-off mode" wherein the motor actuating the valve operates at a constant speed, about a quarter of it's full speed, and wherein switches 38 are used to stop the rotation, a third mode called "anti water-hammer mode" wherein the motor is actuated according to a control law in such a way that water hammer are decreased or removed. All these modes are defined by input logic gates EN1 and EN2 of the input/output stage 37 and the opening/closing request is determined by the state of the input logic gate EN3.

Optionally, the mode's handler 27 comprises a forth mode called "AE mode" wherein said mode's handler 27 receives a data packet from the ADC's handler 31 to determine a setting corresponding to a position of the final drive shaft of the motor. The analogic signal incoming from the EA1 port is decoded and transformed into a data packet of 12 bits by the Analog to Digital Converter (ADC) 30, subsequently, said data packet is sent to the mode's handler 27 by the ADC's handler 31.

The power controller and autopilot unit 25 determines the transistor's commands of the power bridge from the information sent by hall sensor 24 of the motor 17, the pulse width modulation (PWM), the direction of rotation of the motor 17 and the mode.

The resolver 18 piloted by an electronic component such as AD2S1200, for example, is a position sensor. The voltage of the resolver 18 is generated by the decoder 21 which is an electronic component AD2S1200. Subsidiary signals generated by the resolver 18 are decoded by the decoder 21 which transforms said subsidiary signals in two numerical data packets of 12 bits, a first data packet corresponding to the position and a second data packet corresponding to the speed. Said decoder 21 sends data packets to the decoder's handler 22 which, in a first hand, sends to the second ADC's handler 33 and to the control unit 28 the data packet corresponding to the position, and in a second hand, sends to the failure's handler 23 the data packet corresponding to the speed. Said failure's handler 23 verifies periodically that the motor 18 rotates, i.e. that the speed of the motor 18 is not equal to zero, when an opening and/or closing command is pending.

Furthermore, the failure's handler 23 monitors and detects different kind of failures such as a switch failure, i.e. when switch's information of opening and closing are sent simultaneously, a blocking of the final drive shaft of the motor, corresponding to a motor's speed equal to zero, a resolver's failure wherein said failure is detected by the decoder 21, a position slaving failure, or an overcurrent's detection.

When a failure is detected, the failure's information is sent to mode's handler 27 via the state's handler 26. Then a setting corresponding to the "damaged mode" is sent to the control unit 28.

When no failure is detected, and when the mode's handler 27 receives a data packet from the ADC's handler 31, the control unit 28 compare these settings with the position copy. Then the control unit 28 amplifies it and determines the direction of rotation and the error's amplitude. Said direction of rotation and error's amplitude are sent to the autopilot unit 25.

When no failure is detected and when the mode's handler 27 receives no data packet from the ADC's handler 31, the mode's handler 27 sends to the control unit 27 a setting corresponding to the "anti water hammer mode". This setting corresponding to the "anti water hammer mode" is stored in the non volatile memory ROM 29 and is a function of time according to the following equation:

$$powersetting = at^3 - bt^2 + ct$$

Wherein a, b and c are constants and t is the time expressed in seconds.

Figure 7:
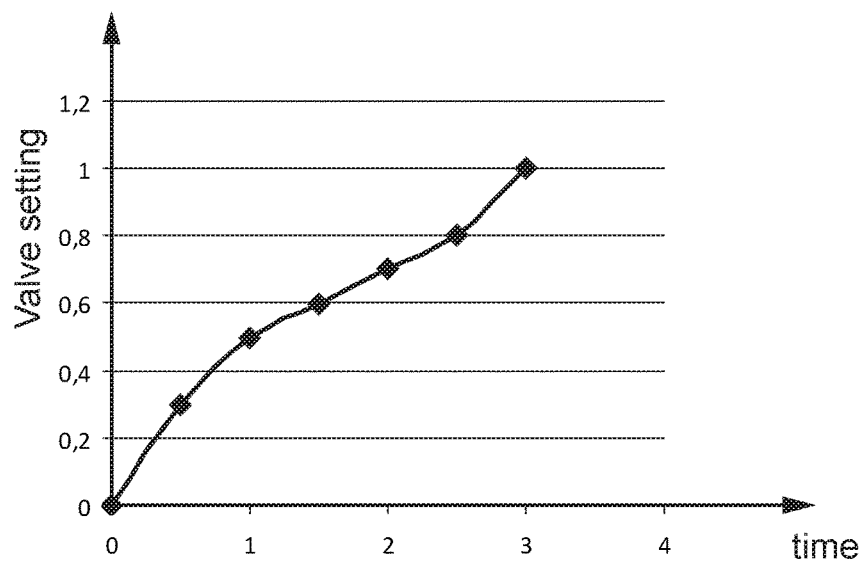
FIG. 7 is a chart of the power setting sends by the controller to the power circuitry in function of time.

An example of this function of time is depicted in FIG. 7. In this particular example, the equation is the following:

$$powersetting = 0,067t^3 - 0,347t^2 + 0,776t$$

It should be noted that the power settings send by the controller 20 to the power circuitry 16 is a function of at least one parameter, time; nevertheless, said power settings could be a function of a plurality of parameters without departing from the scope of the invention.

Advantageously, the controller 20, the power controller and autopilot unit 25, the failure's handler 23, the decoder's handler 22, the ADC's handlers 31 and 33 and the non volatile memory ROM 29 are included in a programmed logic device (PLD), such as a Field Programmable gate array (FPGA) for example, to calculate the position and/or speed correction in pro rata to errors between the collected data relative to the position and/or the speed of the valve and collected data relative to the power setting, etc. . . .

It is obvious that the programmed logic device (PLD) calculating notably the position and/or speed correction in pro rata to errors between the collected data relative to the position and/or the speed of the valve and collected data relative to the power setting can be substituted by any equivalent means such as a software for example without departing from the scope of the invention.

Moreover, the controller 20 comprises advantageously, means to connect said controller 20 to an electronic control unit (ECU) adapted to be connected with a plurality of valve actuator, and/or to connect said controller 20 to at least one another valve actuator.

Such architecture allows a wide range of applications. A non limitative example of application in an aircraft refuelling system is disclosed hereinafter.

Figure 8:
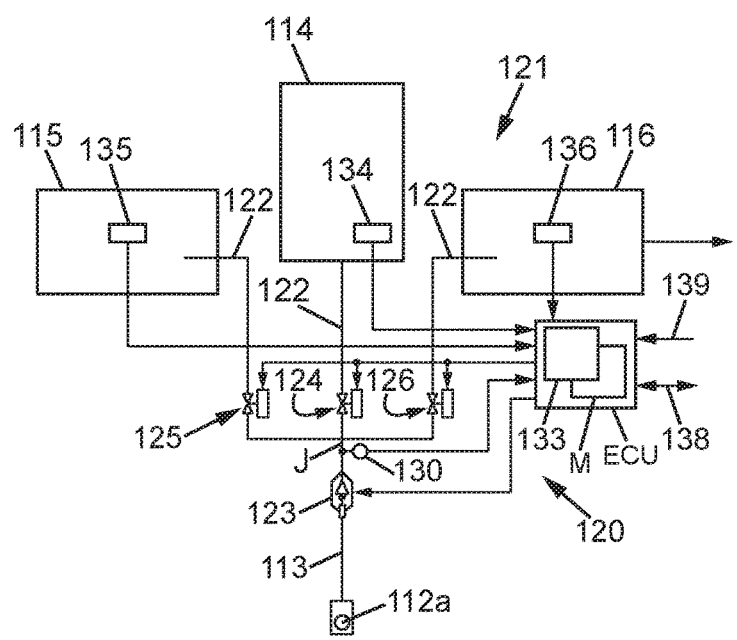
FIG. 8 shows schematically an aircraft refuelling equipment including valve actuators according to the invention.

FIG. 8 is a schematic diagram of an aircraft refuelling system 100 conventionally used for refuelling of commercial airplanes such as A320. This aircraft refuelling system 100 is provided with solenoid valves 111 in a wye connection with a refuel coupling 112 that defines a fuel supply inlet 112*a* for the fuel supply line 113. In this example, the centre tank 114 has a capacity of 8250 liters and each of the wing tanks 115, 116 has a capacity of 6925 liters (inner the fuel tank). Optional fuel tanks, for example at least one Additional Center Tank ACT may also be provided (not shown).

Embodiments of the invention provide equipment 120 for dynamically refuelling the aircraft tank system 121, in order to minimize refuelling times. Such equipment 120 may be properly used for a plane having a plurality of fuel tanks, for instance three fuel tanks 114, 115, 116. The equipment 120 comprises a fuel supply line 113, three tank supply lines and three fuel tanks 114, 115, 116. The refuelling pipework, hereafter called pipework 122, has respective pipes connected to each of the fuel tanks 114, 115, 116. A wye connection is formed trough a junction J of the pipework 122. Here one valve, for instance a solenoid valve 123, is arranged between the fuel supply inlet 113 and the junction J, so as to function as a master valve with respect to a plurality of controllable valves 124, 125, 126. The valve 124 is connected to the fuel tank 114, the valve 125 is connected to the fuel tank 115, and the valve 126 is connected to the fuel tank 116. Accordingly, each of these valves 124, 125, 126 allows each fuel tank to be disconnected from the fuel supply line 113 such that fuel can be directed as required.

One or more captors 130 are provided to transmit a physical parameter indicative of flow conditions within the pipework 122. Here the captor 130 is a pressure sensor placed between the junction J and the solenoid valve 123 or any similar master valve directly connected to the fuel supply line 113. The pressure sensor or similar captor 130 is in connection with an electronic control unit ECU. This captor 130 allows, in combination with the respective valve-actuator assemblies also connected to the electronic control unit ECU, a regulation of the respective refuelling flow rates to be performed. The captor 130 could be also replaced by one or more flow meters adequately arranged in the pipework 122 and each providing signals indicative of a flow rate.

Data about the pressure sensed by the captor 130 within the pipework 122 and data about the opening of the first valves 124, 125, 126 are retrieved by a receiving module M of the electronic control unit. This module M is configured to estimate the respective first valve flow parameters, using the pressure data and the position data.

Each of the valves 124, 125, 126 may be fitted with actuators and positioners to define a flow control valve regulating the fuel flow. Referring to FIGS. 4A and 4B which schematically illustrate a non-limitative example for the flow control valve architecture, the valve body B may be a ball rotated by a conventional positioner (not shown) driven by a servomotor 131 or similar servo-unit. Here, a position sensor 132 provides a signal indicative of the position of the valve body B. When the motor element of the servomotor 131 is of the rotating type, the position sensor 132 may sense the angular position of the valve body B or another element connected to the valve body B. The opening of the valves 124, 125, 126 may be selectively adjusted at a defined open position between the full open position as shown in FIG. 4A and the closed position as shown in FIG. 4B. As a result, the flow rate may be adjusted between the two valve ports of the ball valve. The actuator allows adjusting in real time the opening of the corresponding first valve. The angular position of the rotating drive D may precisely define the opening ratio of the valve body B.

While a straight through ball-valve, having a quick response and long life, is here represented, it is understood that the first valves 124, 125, 126 are not necessarily ball-valves or similar quarter turn valves. More generally, the valves 124, 125, 126 each comprise a valve body with a plurality of adjustable positions between the full open position and the closed position, in order to allow the flow or pressure regulation of the fuel or similar fluid to be stored in the respective fuel tanks 114, 115, 116.

The control of the position of the respective valve bodies may take into account flow parameter data and fuel level data as well. Here, the fuel level data may be obtained by measuring, for each of the fuel tanks 114, 115, 116 to be refueled, a fuel level. One and preferably a plurality of gauging devices 134, 135, 136 may be associated with each of the fuel tanks 114, 115, 116 to provide a signal indicative of the measured fuel level to the electronic control unit ECU. During the refuelling operation, the electronic control unit is processing the signals of the captor 130 and the gauging devices 134, 135, 136 to dynamically regulate the opening of the respective first valves 124, 125, 126. Signals of the captor 130 or any similar captors are thus converted into first valve flow parameter data, while signals of the gauging devices 134, 135, 136 are converted into fuel level data. These data or any similar data retrieved by the electronic control unit ECU are used to determine the individual needs in the respective fuel tanks 124, 125, 126.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An assembly comprising a valve and a valve actuator, the valve actuator comprising:
    a housing,
    a motor coupled to the valve, wherein rotation of the motor changes the position of the valve from a first position in which fluid flow may occur along at least one path and a second position in which fluid flow is either blocked or may occur along at least one second path, the valve presenting a plurality of adjustable positions between the first position and the second position, said motor being normally supplied with electrical power from a main source of electrical power,
    at least one sensor configured to detect the position of the valve, a switch controlling the delivery of electrical power to the motor, a power circuitry connected to the switch, a controller connected to the at least one sensor and to the power circuitry, the controller including a plurality of power settings each corresponding to one of the positions of the valve, said controller collecting in real time data relative to the position of the valve and data relative to the power setting, calculating the position correction in pro rata solely as to errors between the collected data relative to the position of the valve and collected data relative to the power setting, and sending a new power setting to the power circuitry based solely on the calculated position correction, wherein the power circuitry amplifies the controller signal.

2. The assembly according to claim 1, wherein the valve is a ball valve.

3. The assembly according to claim 1, wherein the valve actuator further comprises a reduction gear assembly coupling the motor to the valve.

4. The assembly according to claim 1, wherein the motor of the valve actuator is a brushless motor.

5. The assembly according to claim 1, wherein the power setting sent by the controller of the valve actuator to the power circuitry is stored in a non volatile memory.

6. The assembly according to claim 1, wherein the valve actuator further comprises means to detect a motor failure.

7. The assembly according to claim 1, wherein the controller of the valve actuator further comprises means to connect said controller to an electronic control unit (ECU) adapted to be connected with a plurality of valve actuator.

8. The assembly according to claim 1, wherein the controller of the valve actuator further comprises means to connect said controller to at least one another valve actuator.

9. The assembly according to claim 1, wherein the motor of the valve actuator comprises a hall sensor to detect the position and/or the rotation of said motor.

10. The assembly according to claim 1, wherein the reduction gear assembly coupling the motor to the valve comprises a worm gear.

11. The assembly according to claim 1, wherein the controller of the valve actuator comprises means for calculating the position correction in pro rata to errors between the collected data relative to the position of the valve and collected data relative to the power setting.

12. The assembly according to claim 1, wherein the power setting sent by the controller of the valve actuator to the power circuitry based solely on the calculated position correction varies as a function of time.

13. The assembly according to claim 12, wherein the controller of the valve actuator comprises a mode's handler comprising an "anti water-hammer mode" wherein the motor is actuated according to a control law in such a way that water hammer is decreased or removed, wherein the power setting is a function of time according to the control law:

$$powersetting = at^3 - bt^2 + ct$$

wherein a, b and c are constants and t is the time expressed in seconds.

14. The assembly according to claim 1, wherein the valve assembly further comprises means adapted to detect a failure in the valve actuator, such that a failure of the controller, a position error of the valve, or an overcurrent.

15. The assembly according to claim 14, wherein the opening and/or the closing of the valve is actuated with a constant speed when a failure is detected in the valve actuator.

16. The assembly according to claim 14, wherein the failure is one of a failure of the controller, a position error of the valve, or an overcurrent.

* * * * *